Feb. 20, 1934.                J. A. MAURER, JR                    1,947,564
                                 OPTICAL SYSTEM
                              Filed April 6, 1931           4 Sheets-Sheet 1
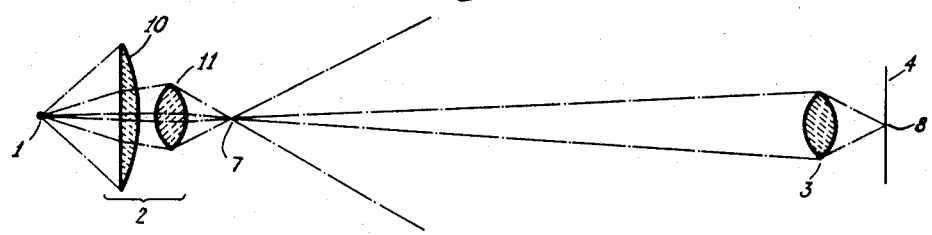
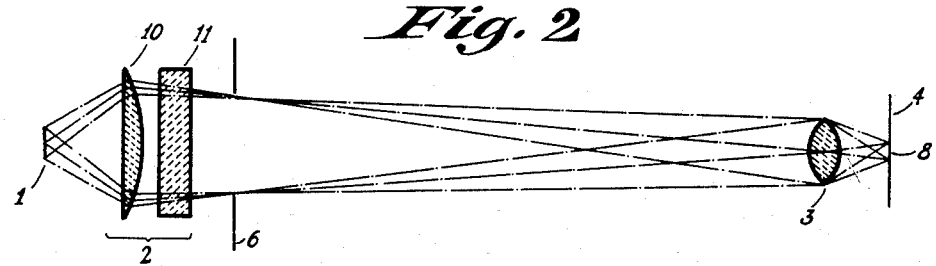
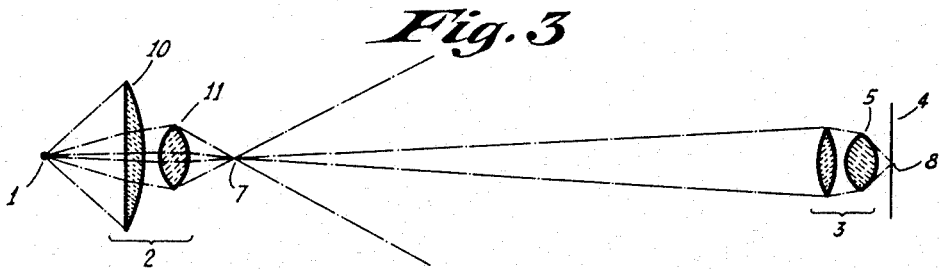
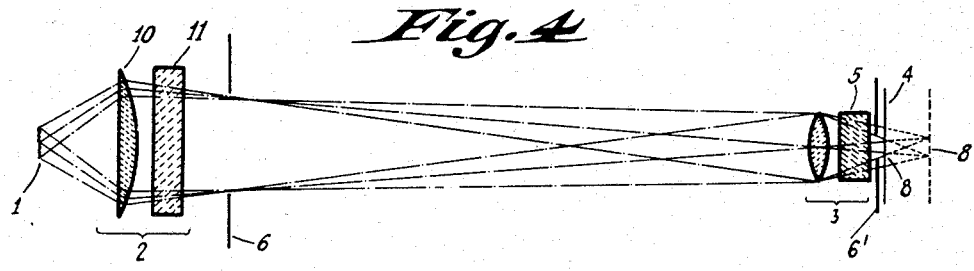
INVENTOR
J. A. MAURER, Jr.
BY
ATTORNEY Feb. 20, 1934.     J. A. MAURER, JR     1,947,564
OPTICAL SYSTEM
Filed April 6, 1931     4 Sheets-Sheet 2

INVENTOR
J. A. MAURER, Jr.
BY
ATTORNEY

Feb. 20, 1934.  J. A. MAURER, JR  1,947,564
OPTICAL SYSTEM
Filed April 6, 1931  4 Sheets-Sheet 3

INVENTOR
J. A. MAURER, Jr.
BY
ATTORNEY

Patented Feb. 20, 1934

1,947,564

UNITED STATES PATENT OFFICE 1,947,564

OPTICAL SYSTEM

John A. Maurer, Jr., New York, N. Y., assignor to Radio Corporation of America, a corporation of Delaware Application April 6, 1931. Serial No. 528,095

18 Claims. (Cl. 88—24)

This invention relates to optical systems, and more particularly to such optical systems as are used in phonographic apparatus, such as that of the photo-electric type, for producing a narrow linear image of either a primary or a secondary light source upon an image area such, for example, as the sound-track of a sound and picture film.

The present application pertains more particularly to such systems in which the dimensions of the final image are dependent upon the characteristics of the system rather than on the dimensions of the light-source or of a slit serving as a secondary source, and accordingly is related to my applications Serial Nos. 528,096, 528,097, 528,098, and 528,099, filed concurrently herewith and pertaining to collateral inventions of the same general kind. The present application, however, is characterized by the employment of a primary group of lenses having a sphero-cylindrical power and arranged to form a horizontal real image of the light-source reduced in its vertical dimension between such group of lenses and the secondary group or objective lens.

One object of this invention is to produce such an optical system of reasonably high light efficiency and at the same time capable of producing an image of the necessary lateral attenuation.

Another object of this invention is to produce such a system which is capable of reasonable facility of manufacture.

Another object of this invention is to produce such a system which is capable of being manufactured at a reasonable cost under modern production methods.

Another object of this invention is to produce such a system which is adapted to reasonable facility and accuracy in installation.

Another object of this invention is to produce such a system which is adapted to or capable of using present commercially-available lenses or lenses adapted to present commercial manufacture.

Figure 1 is a vertical section of a preferred form of the invention.

Figure 2 is a horizontal section corresponding to Figure 1.

Figure 3 is a vertical section of a modification of Figure 1 employing an objective having a cylindrical component.

Figure 4 is a horizontal section corresponding to Figure 3.

In the above figures:

Figure 5:
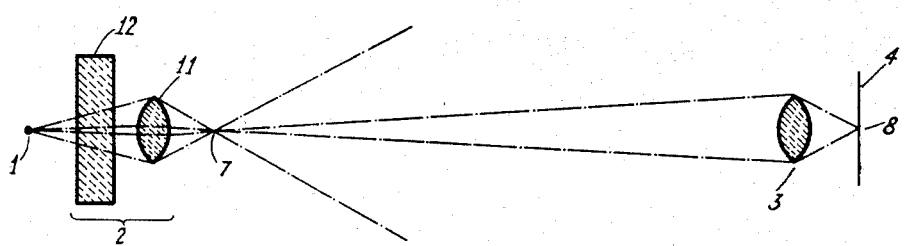
Figure 5 is a vertical section of a second form of the invention.

The light-source is indicated at "1".

The first or primary group of lenses is indicated at "2".

The objective or secondary group of lenses is indicated at "3".

The film or other image area is indicated at "4".

The cylindrical component of the objective, if any, is indicated at "5".

The diaphragm or limiting aperture is indicated at "6".

The objective diaphragm, where used, is indicated at "6'".

The first image of the source is indicated at "7".

The final functioning image is indicated at "8".

And a final virtual image is indicated at "8'".

Such other reference-numerals as may be common to two or more figures will be hereinafter more specifically pointed out, similar reference numerals referring always to similar parts.

The light in all cases is assumed to pass from left to right.

In the form of the invention shown in Figures 1, 2, and the modifications thereof in Figures 3 and 4:

The primary group 2 is composed of two lenses, a spherical lens 10 and a cylindrical lens 11. The spherical lens is of such power, as shown in Figure 2, that it alone would cast an image of the source 1 on the entrance-pupil of the objective 3.

In this as well as in all the following modifications, the source 1 is preferably in the form of a high-intensity lamp filament of the helical type, but it may obviously be of any other appropriate type, such as a small arc-lamp, a linear filament, a Nernst glower, etc.; or it may be a secondary source such as an illuminated aperture, or the reflector of a galvanometer or the equivalent as used in sound-recording apparatus or oscillographs, and the word "source" hereinafter is used in reference to any of these. The objective 3 is shown as a double-convex spherical lens, but ordinarily would be of more complicated form, i. e. a microscope objective or the equivalent would be used. The cylindrical objective shown in Figures 3 and 4 may be constructed as shown, from a positive spherical lens and a positive cylindrical lens 5 of shorter focal length or it may be composed of a microscope objective provided with a cylindrical component, or it may be constructed as shown in my application Serial Number 523,284, filed March 17, 1931.

The positive cylindrical lens 11 is of such focal length that, in combination with the lens 10, it forms a linear image of the source at 7, and this image is smaller in its vertical dimension than the source in the same ratio as the distances of the source and the image from the principal planes of the lens combination. The lateral extent of this image, and thereby the length of the final image 8, is defined by the diaphragm 6.

The objective 3 is so positioned that it focuses an image of the line 7 upon the film or other image area 4 at 8.

In the form shown in Figures 3 and 4, the objective likewise forms a sharp image 8 in the vertical plane, but in the horizontal plane, due to the astigmatic nature of the objective, there is a tendency to form an image at 8' and the ends of the linear image would therefore not be sharply defined. I accordingly place a diaphragm 6' between this lens and the image-area to cut off the marginal rays of less intensity and limit the image to the desired dimension.

Figure 6:
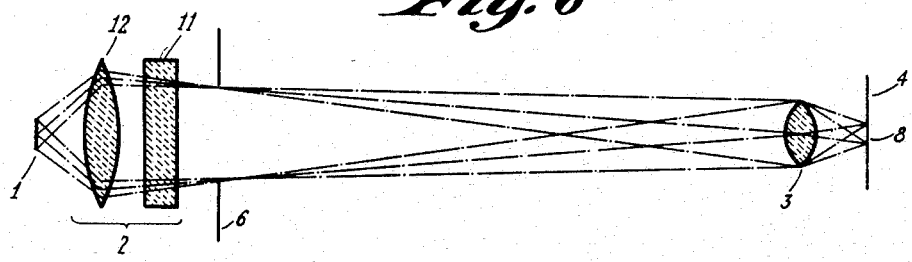
Figure 6 is a horizontal section corresponding to Figure 5.
Figure 7:
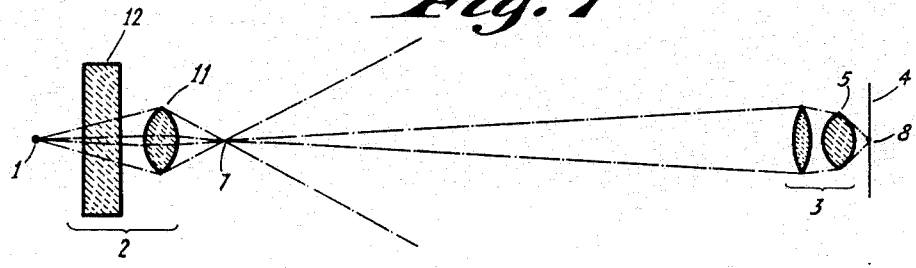
Figure 7 is a vertical section of a modification of Figure 5 employing an objective having a cylindrical component.
Figure 8:
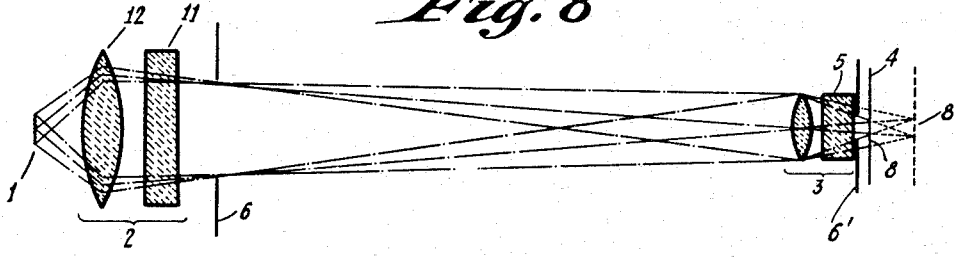
Figure 8 is a horizontal section corresponding to Figure 7.

The form of the invention shown in Figures 5 and 6, and the modification thereof shown in Figures 7 and 8 is, in general, similar in operation to that of Figures 1 and 2 and its modification in Figures 3 and 4. It differs, however, in that I have substituted a cylindrical lens 12, with its axis vertical, for the spherical lens 10, thereby permitting such lenses to be considered independently, both in design and in adjustment. This cylindrical lens 12, like the lens 10, images the source at the entrance-pupil of the objective 3, while the linear image 7 is formed by the lens 11 unassisted by the lens 12.

Figure 9:
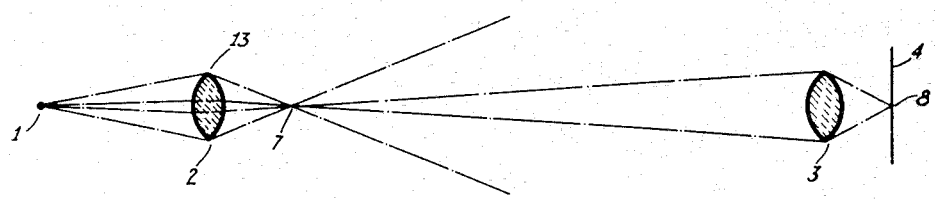
Figure 9 is a vertical section of a third form of the invention.
Figure 10:
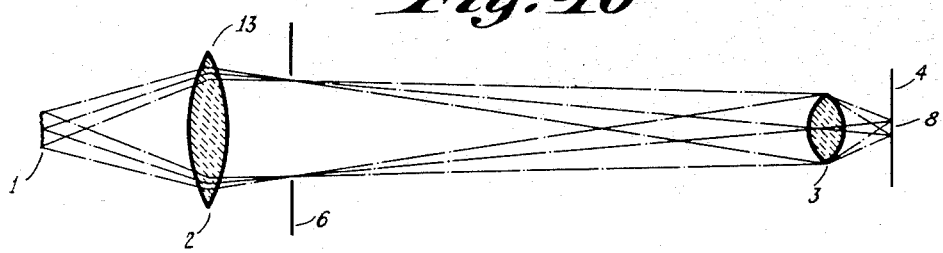
Figure 10 is a horizontal section corresponding to Figure 9.
Figure 11:
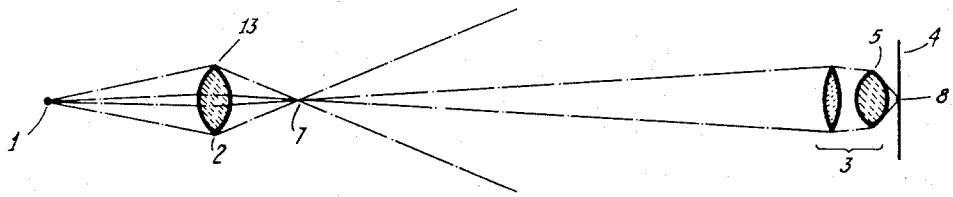
Figure 11 is a vertical section of a modification of Figure 9 employing an objective having a cylindrical component.
Figure 12:
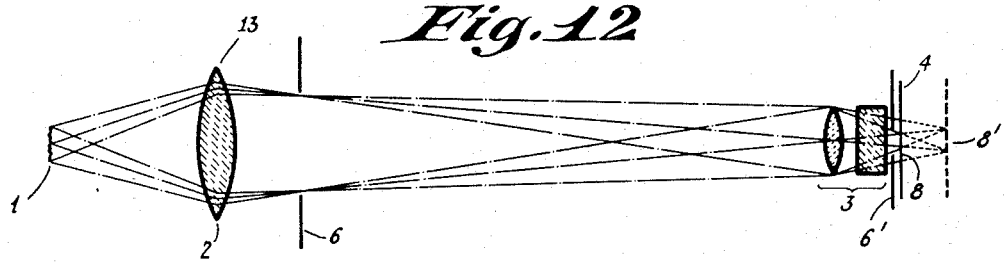
Figure 12 is a horizontal section corresponding to Figure 11.

The form of the invention shown in Figures 9 and 10, and the modification thereof shown in Figures 11 and 12 corresponds to both of the preceding forms but a sphero-cylindrical lens 13 is used as group 2 instead of a combination of lenses.

This sphero-cylindrical lens can be considered as the spherical lens 10 and the cylindrical lens 11 of Figures 1 to 4 ground on a single piece of glass if such a lens is considered as a sphere plus a cylinder; or if it is considered as crossed cylinders it includes the crossed cylinders of Figures 5 to 8, the focal lengths being so chosen that the operation remains as described under those modifications.

Figure 13:
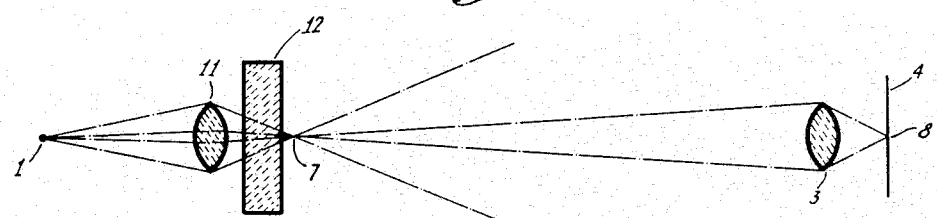
Figure 13 is a vertical section of a fourth form of the invention.
Figure 14:
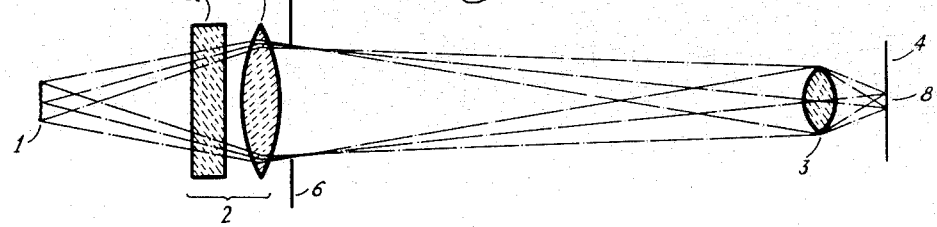
Figure 14 is a horizontal section corresponding to Figure 13.
Figure 15:
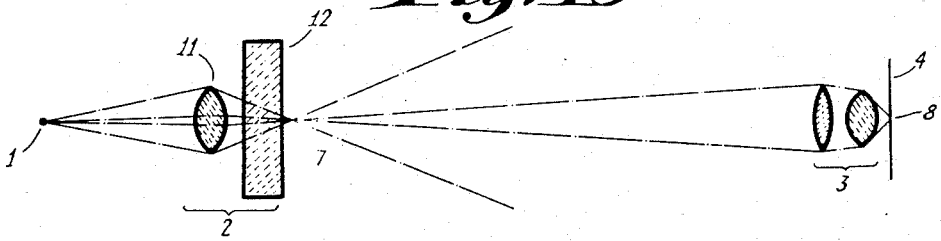
Figure 15 is a vertical section of a modification of Figure 13 employing an objective having a cylindrical component.
Figure 16:
Figure 16 is a horizontal section corresponding to Figure 15.

The form of the invention shown in Figures 13 and 14 and its modification shown in Figures 15 and 16 are quite similar to the form of the invention shown in Figures 5 to 8, but distinguishes in that the positions of the lenses 11 and 12 are reversed, the horizontal lens 11 thereby forming its image on the other side of the lens 12. This form is not quite as desirable as the form in Figures 5 to 8, as the lens 11 is necessarily of short focal length and at some distance from the source in both cases in order to produce a sufficiently fine line at 7, and in the form shown in Figures 13 to 16 this limits the effective aperture of the lens 12, whereas it is not so limited in the form.

It will be understood that in this specification, the terms "horizontal" and "vertical" have not been used in any absolute sense of the term but merely as indicating relative position or direction, and that choice between these terms has been determined merely by convenience in illustration.

I claim:

1. A linear-image-forming optical system comprising a plurality of lens components, one of said lens components having cylindrical power and being so located in relation to said light source as to form a linear image between said lens components, and the other of said lens components being located with the said linear image at a focus thereof whereby it will form a linear image of said linear image on an image area at the other of its conjugate foci.

2. A linear-image-forming optical system comprising a plurality of lens components, one of said lens components having cylindrical power and being so located in relation to said light source as to form a linear image narrower than the source between said lens components, and the other of said lens components being located with the said linear image at a focus thereof whereby it will form a linear image of said linear image on an image area at the other of its conjugate foci.

3. A linear-image-forming optical system comprising a plurality of lens components, one of said lens components having a positive spherocylindrical power and being so located in relation to said light source as to form a linear image between said lens components, and the other of said lens components being located with the said linear image at a focus thereof whereby it will form a linear image of said linear image on an image area at the other of its conjugate foci.

4. A linear-image-forming optical system comprising a plurality of lens components, one of said lens components including a spherical lens element and a cylindrical lens element having its axis parallel to the final image and being so located in relation to said light source as to form a linear image narrower than the light source between said lens components, and the other of said lens components being located with the said linear image at a focus thereof whereby it will form a linear image of said linear image on an image area at the other of its conjugate foci.

5. A linear-image-forming optical system comprising a plurality of lens components, one of said lens components including a spherical lens element focusing its image at the entrance-pupil of the second lens component and a cylindrical lens element having its axis parallel to the final image and being so located in relation to said light source as to form a linear image narrower than the light source between said lens components, and the other of said lens components being located with the said linear image at a focus thereof whereby it will form a linear image of said linear image on an image area at the other of its conjugate foci.

6. A linear-image-forming optical system comprising a plurality of lens components, one of said lens components including a spherical lens element and a cylindrical lens element between the spherical lens element and the second lens component having its axis parallel to the final image and being so located in relation to said light source as to form a linear image narrower than the light source between said lens components, and the other of said lens components being located with the said linear image at a focus thereof whereby it will form a linear image of said linear image on an image area at the other of its conjugate foci.

7. A linear-image-forming optical system comprising a plurality of lens components, one of said lens components including a cylindrical lens element having its axis crossing the axis of the system at a right angle to that at which the final image crosses such axis and a cylindrical lens element having its axis parallel to the final image and being so located in relation to said light source as to form a linear image narrower than the light source between said components, and the other of said lens components being located with the said linear image at a focus thereof whereby it will form a linear image of said linear image on an image area at the other of its conjugate foci.

8. A linear-image-forming optical system comprising a plurality of lens components, one of said lens components including a cylindrical lens element having its axis crossing the axis of the system at a right angle to that at which the final image crosses such axis and focusing its image at the entrance-pupil of the second lens component, and a cylindrical lens element having its axis parallel to the final image and being so located in relation to said light source as to form a linear image narrower than the light source between said lens components, and the other of said lens components being located with the said linear image at a focus thereof whereby it will form a linear image of said linear image on an image area at the other of its conjugate foci.

9. A linear-image-forming optical system comprising a plurality of lens components, one of said lens components including a cylindrical lens element having its axis crossing the axis of the system at a right angle to that at which the final image crosses such axis and focusing its image at the entrance-pupil of the second lens component, and lying between the first cylindrical lens element and the second lens component, and a cylindrical lens element having its axis parallel to the final image and being so located in relation to said light source as to form a linear image narrower than the light source between said lens components, and the other of said lens components being located with the said linear image at a focus thereof whereby it will form a linear image of said linear image on an image area at the other of its conjugate foci.

10. A linear-image-forming optical system comprising a plurality of lens components, one of said lens components having a positive spherocylindrical power and being so located in relation to said light source as to form a linear image between said lens components, and the other of said lens components having a positive cylindrical power and being located with the said linear image at a focus thereof whereby it will form a linear image of said linear image on an image area at the other of its conjugate foci.

11. A linear-image-forming optical system comprising a plurality of lens components, one of said lens components having cylindrical power and being so located in relation to said light source as to form a linear image between said lens components, and the other of said lens components being located with the said linear image at a focus thereof whereby it will form a linear image of said linear image on an image area at the other of its conjugate foci, and a diaphragm defining the length of the first linear image referred to.

12. A linear-image-forming optical system comprising a plurality of lens components, one of said lens components including a spherical lens element and a cylindrical lens element having its axis parallel to the final image and being so located in relation to said light source as to form a linear image narrower than the light source between said lens components, and the other of said lens components being located with the said linear image at a focus thereof whereby it will form a linear image of said linear image on an image area at the other of its conjugate foci, and a diaphragm defining the length of the first linear image referred to.

13. A linear-image-forming optical system comprising a plurality of lens components, one of said lens components including a spherical lens element and a cylindrical lens element between the spherical lens element and the second lens component having its axis parallel to the final image and being so located in relation to said light source as to form a linear image narrower than the light source between said lens components, and the other of said lens components being located with the said linear image at a focus thereof whereby it will form a linear image of said linear image on an image area at the other of its conjugate foci, and a diaphragm defining the length of the first linear image referred to.

14. A linear-image-forming optical system comprising a plurality of lens components, one of said lens components including a cylindrical lens element having its axis crossing the axis of the system at a right angle to that at which the final image crosses such axis and focusing its image at the entrance-pupil of the second lens component, and a cylindrical lens element having its axis parallel to the final image and being so located in relation to said light source as to form a linear image narrower than the light source between said lens components, and the other of said lens components being located with the said linear image at a focus thereof whereby it will form a linear image of said linear image on an image area at the other of its conjugate foci, and a diaphragm defining the length of the first linear image referred to.

15. A linear-image-forming optical system comprising a plurality of lens components, one of said lens components including a cylindrical lens element having its axis crossing the axis of the system at a right angle to that at which the final image crosses such axis and focusing its image at the entrance-pupil of the second lens component, and lying between the first cylindrical lens element and the second lens component, and a cylindrical lens element having its axis parallel to the final image and being so located in relation to said light source as to form a linear image narrower than the light source between said lens components, and the other of said lens components being located with the said linear image at a focus thereof whereby it will form a linear image of said linear image on an image area at the other of its conjugate foci, and a diaphragm defining the length of the first linear image referred to.

16. A linear-image-forming optical system comprising a plurality of lens components, one of said lens components including a spherical lens element focusing its image at the entrance-pupil of the second lens component and a cylindrical lens element having its axis parallel to the final image and consisting of a single lens having compound curvature being so located in relation to said light source as to form a linear image narrower than the light source between said lens components, and the other of said lens components being located with the said linear image at a focus thereof, whereby it will form a linear image of said linear image on an image area at the other of its conjugate foci.

17. A linear-image-forming optical system comprising a plurality of lens components, one of said lens components including a cylindrical lens element having its axis crossing the axis of the system at a right angle to that at which the final image crosses such axis and focusing its image at the entrance-pupil of the second lens component, and a cylindrical lens element having its axis parallel to the final image and consisting of a single lens having compound curvature, being so located in relation to said light source as to form a linear image narrower than the light source between said lens components, and the other of said lens components being located with the said linear image at a focus thereof, whereby it will form a linear image of said linear image on an image area at the other of its conjugate foci.

18. A linear-image-forming optical system comprising a plurality of lens components, one of said lens components including a positive lens element focusing an image at the entrance-pupil of the second lens component in the plane defined by the axis of the system and the final image, and a cylindrical lens element between said positive lens element and the second lens component and having its axis parallel to the final image and being so located in relation to said light source as to form a linear image narrower than the light source between said lens components, and the other of said lens components being located with the said linear image at a focus thereof whereby it will form a linear image of said linear image on an image area at the other of its conjugate foci.

JOHN A. MAURER, Jr.